(12) United States Patent
Kennedy et al.

(10) Patent No.: US 6,727,322 B2
(45) Date of Patent: Apr. 27, 2004

(54) AMPHIPHILIC NETWORKS, IMPLANTABLE IMMUNOISOLATORY DEVICES, AND METHODS OF PREPARATION

(75) Inventors: Joseph P. Kennedy, Akron, OH (US); Irada S. Isayeva, Akron, OH (US)

(73) Assignee: The University of Akron, Akron, OH (US)

( * ) Notice: Subject to any disclaimer, the term of this patent is extended or adjusted under 35 U.S.C. 154(b) by 85 days.

(21) Appl. No.: 10/114,647

(22) Filed: Apr. 1, 2002

(65) Prior Publication Data

US 2003/0232925 A1 Dec. 18, 2003

(51) Int. Cl.⁷ .......................... C08L 53/02; C08F 10/10; A61K 9/50; A61K 47/32; A61F 13/00
(52) U.S. Cl. ...................... 525/314; 525/316; 525/244; 525/98; 525/145; 525/480; 526/348.7; 424/424; 424/471; 424/482; 435/180; 514/866
(58) Field of Search ................................. 525/314, 316, 525/244, 98, 145, 480; 526/348.7; 424/424, 471, 482; 435/180; 514/866

(56) References Cited

U.S. PATENT DOCUMENTS 5,844,056 A * 12/1998 Kennedy et al. ......... 526/348.7
6,365,171 B1 * 4/2002 Kennedy et al. ............ 424/422

* cited by examiner

Primary Examiner—Rabon Sergent
Assistant Examiner—Olga Asinovsky
(74) Attorney, Agent, or Firm—Roetzel & Andress

(57) ABSTRACT

The present invention provides high mechanical strength amphiphilic polymeric networks and implantable biological devices made therefrom that are capable of encasing and, thus, immunoisolating biological material from an immunological response of a host individual. The present invention also provides methods for making the amphiphilic networks and implantable biological devices. The present invention also provides a method for the treatment of type I diabetes mellitus comprising the steps of encasing a sufficient amount of islet of Langerhans cells within said biological device, wherein said biological device is capable of immunoisolating said encased islet cells upon implantation into an individual; implanting said biological device into a diabetic host individual; allowing said implanted biological device to remain implanted in said diabetic individual for a time sufficient to normalize the blood glucose level in said diabetic individual.

22 Claims, 7 Drawing Sheets

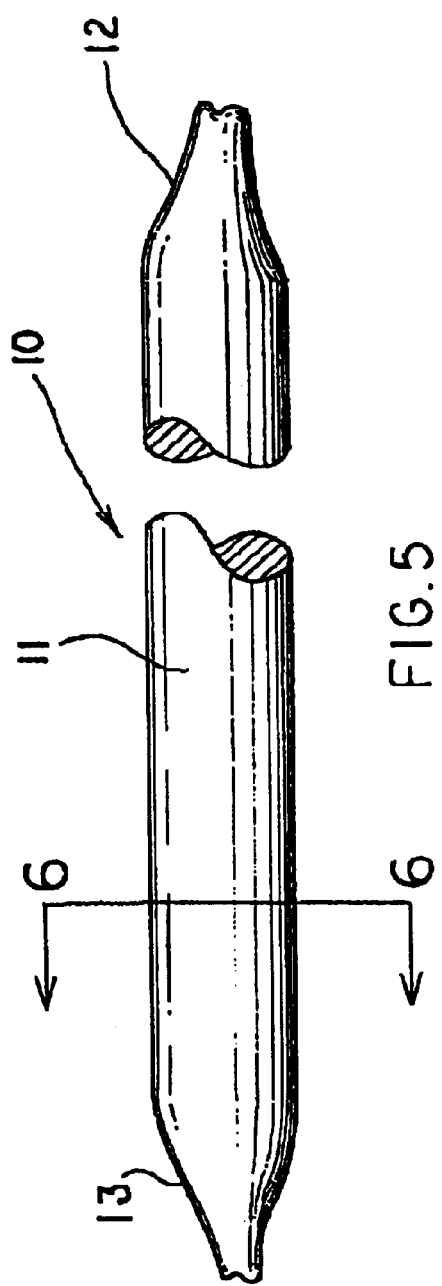
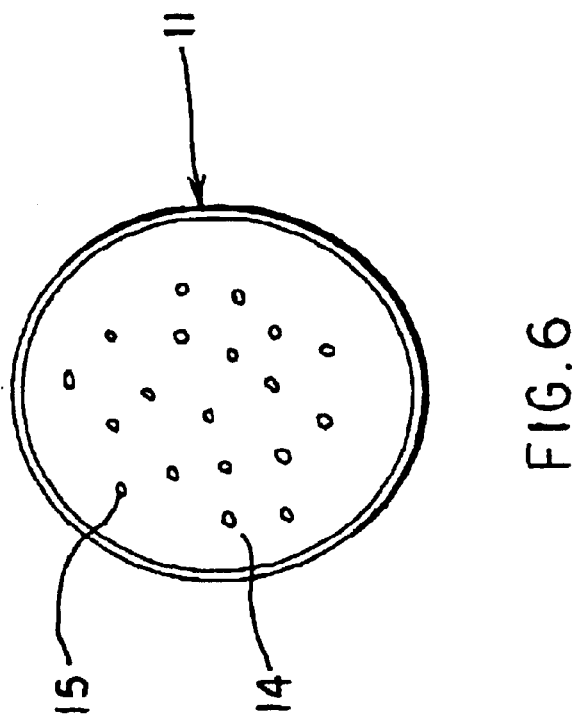
FIG. 5
FIG. 6

AMPHIPHILIC NETWORKS, IMPLANTABLE IMMUNOISOLATORY DEVICES, AND METHODS OF PREPARATION

The present invention was made in the course of research that was supported by National Science Foundation (NSF) Grant DMR-94-23202. The United States government may have certain rights to the invention herein.

TECHNICAL FIELD OF THE INVENTION

The present invention relates to amphiphilic polymer networks and methods for their preparation. The networks comprise the reaction product of hydrophobic crosslinking agents and hydrophilic monomers. The present invention is more particularly related to an amphiphilic polymer network comprising the reaction product of multi-arm multi-telechelic polyisobutylene stars as hydrophobic crosslinking agents and acrylate or methacrylate hydrophilic monomers. Applications include implantable biological devices comprising the amphiphilic networks that are capable of encapsulating and immunoisolating biologically active moieties, such as cells, from the immune response of a host individual.

BACKGROUND OF THE INVENTION

Many medical deficiencies and diseases result from the inability of cells to produce normal biologically active moieties. Many of these deficiencies can be remedied by implanting the needed biologically active moieties or pharmacological agents into the individual having the deficiency. A well known disease that can be remedied by implanting biological material or a pharmacological agent is Type I diabetes mellitus, wherein the production of insulin by pancreatic Langerhans islet cells is substantially deficient, impaired, or nonexistent.

Encapsulating human islet cells or tissues within a biologically compatible device followed by implanting the device into a host individual has been proposed as a means for providing insulin to an individual with Type I diabetes. However, an individual's immune response frequently attacks foreign biological material such as cells, tissues, and organs. And the response severely limits the effectiveness of methods that involve implanting foreign biological material.

Porcine pancreatic islet cells can produce insulin, and their supply is much greater than that of human pancreatic islet cells. Therefore, transplanting porcine islet cells, if effectively immunoisolated from the normal immunological response of a human, would be of great benefit to a vast number of individuals with type I diabetes.

Amphiphilic polymer networks can serve as a means to encapsulate and thereby immunoisolate implantable biologically active moieties. An amphiphilic polymer network comprises hydrophilic and hydrophobic monomers and polymers that can swell in both polar and nonpolar solvents. Amphiphilic polymer networks have been disclosed in the prior art: U.S. Pat. Nos. 4,486,572 and 4,942,204 to Kennedy, U.S. Pat. No. 5,073,381 to Iván, Kennedy and Mackey, and in Keszler and Kennedy, Journal of Macromolecular Science, Chemistry Edition, Vol. A21, No. 3, pages 319–334 (1984).

U.S. Pat. No. 4,486,572 to Kennedy discloses the synthesis of styryl-telechelic polyisobutylene and amphiphilic networks comprising the copolymerization product of the styryl-telechelic polyisobutylene with vinyl acetate or N-vinyl-2-pyrollidone.

U.S. Pat. No 4,942,204 to Kennedy discloses an amphiphilic copolymer network swellable in water or n-heptane but insoluble in either, comprising the product of the reaction of an acrylate or methacrylate of dialkylaminoalkyl with a hydrophobic bifunctional acryloyl or methacryloyl capped polyelofin. The preferred embodiment disclosed is an amphiphilic network having been synthesized by free-radical copolymerization of linear hydrophobic acrylate (A-PIB-A) or methacrylate (MA-PIB-MA) capped polyisobutylenes with 2-(dimethylamino)ethyl methacrylate (DMAEMA).

U.S. Pat. No. 5,073,381 to Ivan et al., a continuation-in-part of U.S. Pat. No. 4,942,204, discloses various amphiphilic copolymer networks that are swellable in water or n-heptane that comprise the reaction product of a hydrophobic linear acryloyl or methacryloyl capped polyolefin and a hydrophilic polyacrylate or polymethacrylate, such as N,N-dimethylacrylamide (DMAAm) and 2-hydroxyethyl methylmethacrylate (HEMA).

U.S. Pat. No. 4,085,168 to Milkovich et al. describes chemically joined, phase-separated self-cured hydrophilic thermoplastic graft copolymers that are copolymers of at least one hydrophilic (water soluble) ethylenically unsaturated monomer or mixture thereof and at least one copolymerizable hydrophobic macromolecular monomer having an end group that is copolymerizable with the hydrophilic monomer. The resulting copolymer is a graft copolymer characterized as having a comb-type structure consisting of a hydrophilic polymer backbone with hydrophobic polymer side chains bonded thereto. The side chains are disclosed as being bonded to the hydrophilic polymer at only one end of the side chain, so that no network results.

In addition, U.S. Pat. No. 5,807,944 to Hirt et al. discloses an amphiphilic segmented copolymer of controlled morphology comprising at least one oxygen permeable polymer segment and at least one ion permeable polymer segment, wherein the oxygen permeable segments and the ion permeable segments are linked together through a non-hydrolyzable bond. The oxygen permeable polymer segments are selected from polysiloxanes, perfluoroalkyl ethers, polysulfones, and other unsaturated polymers. The ion permeable polymers are selected from cyclic imino ethers, vinyl ethers, cyclic ethers, including epoxides, cyclic unsaturated ethers, N-substituted aziridines, β-lactones, β-lactanes, ketene acetates, vinyl acetates and phosphoranes.

U.S. Pat. No. 5,800,828 to Dionne et al. discloses immunoisolatory vehicles having a core and a surrounding jacket that is capable of secreting a biologically active product or of providing a biological function to a patient, said vehicle being permselective, biocompatible, and having a molecular weight cutoff permitting passage of molecules between the patient and the core of the vehicle, and wherein the jacket is selected from polyacrylonitrile-polyvinylchloride, polyacrylonitrile, poly(methyl methacrylate), poly(vinyl difluoride), polyolefins, polysulfones and celluloses.

U.S. Pat. No. 5,844,056 to Kennedy et al. discloses methods for the synthesis of multi-arm star polymers comprising polyisobutylene arms connected to a well-defined calixarene core. The core comprises multifunctional calix[n]arene where n is an integer from 4 to 16, and methods are also disclosed for synthesizing the polyisobutylene arms stemming from the core. This patent is hereby incorporated by reference.

U.S. patent application having Ser. No. 09/433,660 discloses amphiphilic networks comprising the reaction product of telechelic three-arm polyisobutylene star hydrophobic crosslinking agents and acrylate or methacrylate hydrophilic monomers, and implantable biological devices comprising the amphiphilic networks that are capable of encapsulating and immunoisolating biologically active moieties, such as cells, from the immune response of a host individual. This application is hereby incorporated by reference.

The amphiphilic networks taught in the prior art, while suitable for biomedical applications, have tensile strengths that are rather low, namely less than or equal to about 0.5 MPa. It is therefore desirable in the art to develop amphiphilic networks, and implantable biological devices comprising the amphiphilic networks that have superior immunoisolatory properties, superior mechanical properties, biocompatability, and exhibit excellent biostability when placed into a host individual for extended periods of time.

SUMMARY OF THE INVENTION

It is, therefore, an object of the present invention to provide an amphiphilic network.

It is another object of the present invention to provide an amphiphilic network, as above, that can encase biologically active moieties.

It is another object of the present invention to provide an amphiphilic network, as above, that is immunoisolatory, i.e., networks that can selectively regulate the passage of biological material into, out of, and through the network.

It is another object of the present invention to provide an amphiphilic network, as above, that is biocompatible with a host individual.

It is another object of the present invention to provide an amphiphilic network, as above, that exhibits excellent biostability once implanted into a host individual.

It is another object of the present invention to provide an amphiphilic network, as above, that is hemocompatible with a host individual.

It is another object of the present invention to provide an amphiphilic network, as above, that is readily sterilizable.

It is another object of the present invention to provide an amphiphilic network, as above, that is easily retrievable from a host individual after implantation in an individual.

It is another object of the present invention to provide an amphiphilic network, as above, that exhibits excellent mechanical properties.

It is another object of the present invention to provide an amphiphilic network, as above, that is swellable in both hydrophilic and hydrophobic solvents.

It is another object of the present invention to provide an implantable biological device that can encase biologically active substances and immunoisolate said biologically active substances from the immunological response of a host individual.

It is another object of the present invention to provide a method for treating of Type I diabetes mellitus.

One or more of these or other objects, together with the advantages thereof over the amphiphilic networks and biological devices comprising amphiphilic networks of the existing art, which shall become apparent from the specification that follows, are accomplished by the invention as hereinafter described and claimed.

In general, the present invention provides an amphiphilic network comprising the reaction product of hydrophobic crosslinking agents and hydrophilic monomers, wherein said hydrophobic crosslinking agents are multi-arm multi-telechelic polyisobutylene stars having acrylate or methacrylate end caps and represented by formula (I):

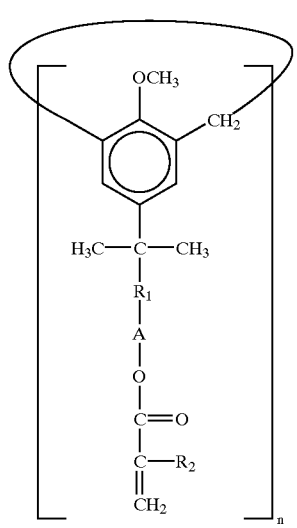

wherein $R_1$ is polyisobutylene represented by formula (II):

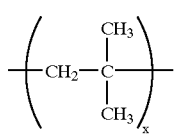

wherein x is the degree of polymerization of said polyisobutylene;

wherein $R_2$ is either H or $CH_3$;

wherein A is a moiety that connects $R_1$ to said acrylate or methacrylate end caps;

wherein n is an integer from 4 to 16; and wherein said hydrophilic monomers are derived from an acrylate selected from the group consisting of formulas (III), (IV) and (V):

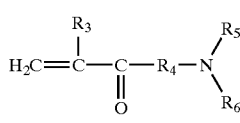

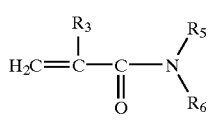

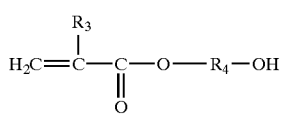

wherein $R_3$ is hydrogen or methyl, $R_4$ is an alkylene group having from about 2 to about 4 carbon atoms, and $R_5$ and $R_6$ may be the same or different and each is hydrogen or an alkyl radical having 1 to about 4 carbon atoms.

The present invention also provides a method of forming an amphiphilic network comprising the steps of:

copolymerizing and crosslinking hydrophilic monomers, wherein said hydrophilic monomers are derived from an acrylate selected from the group consisting of formulas (III), (IV) and (V):

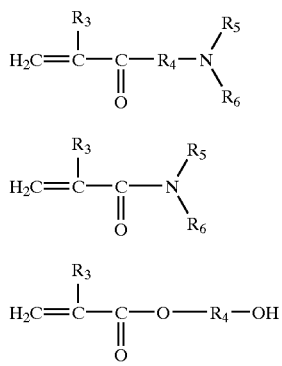

(III)

(IV)

(V)

wherein $R_3$ is hydrogen or methyl, $R_4$ is an alkylene group having from about 2 to about 4 carbon atoms, and $R_5$ and $R_6$ may be the same or different and each is hydrogen or an alkyl radical having 1 to about 4 carbon atoms; and with hydrophobic crosslinking agents, wherein said hydrophobic crosslinking agents are multi-arm multi-telechelic polyisobutylene stars having acrylate or methacrylate end caps and represented by formula (I):

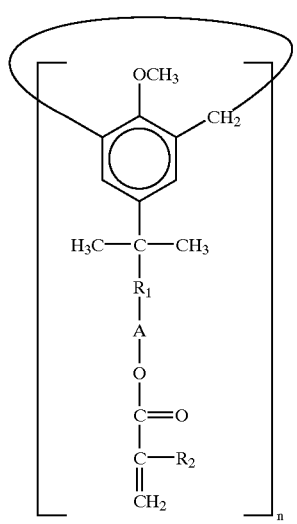

(I)

wherein $R_1$ is polyisobutylene represented by formula (II):

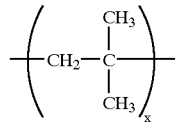

(II)

wherein x is the degree of polymerization of said polyisobutylene;

wherein $R_2$ is either H or $CH_3$;

wherein A is a moiety that connects $R_1$ to said acrylate or methacrylate end caps; and wherein n is an integer from 4 to 16.

The present invention further provides an implantable biological device that is capable of encapsulating biologically active moieties, and immunoisolating said moieties from an immune response of a host individual, said device comprising an amphiphilic network comprising the reaction product of hydrophobic crosslinking agents and hydrophilic monomers, wherein said hydrophobic crosslinking agents are multi-arm multi-telechelic polyisobutylene stars having acrylate or methacrylate end caps and represented by formula (I):

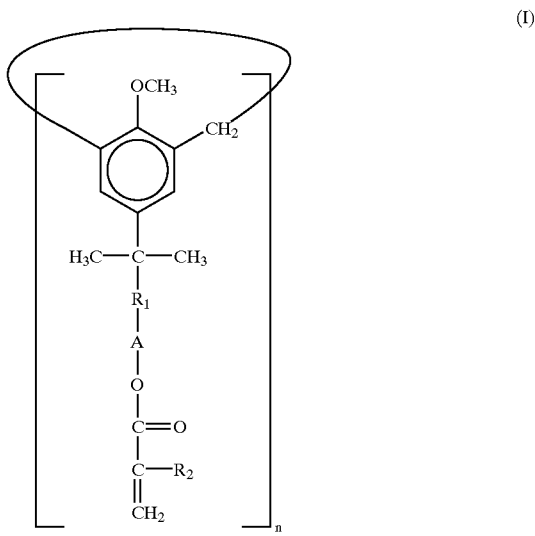

(I)

wherein $R_1$ is polyisobutylene represented by formula (II):

(II)

wherein x is the degree of polymerization of said polyisobutylene;

wherein $R_2$ is either H or $CH_3$;

wherein A is a moiety that connects $R_1$ to said acrylate or methacrylate end caps;

wherein n is an integer from 4 to 16; and wherein said hydrophilic monomers are derived from an acrylate selected from the group consisting of formulas (III), (IV) and (V):

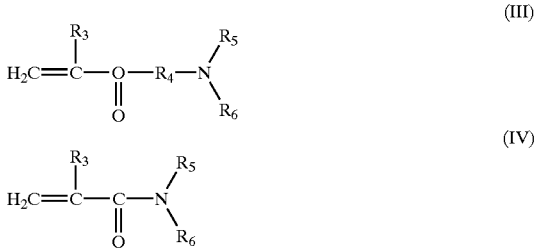

(III)

(IV)

(V)

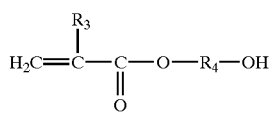

wherein $R_3$ is hydrogen or methyl, $R_4$ is an alkylene group having from about 2 to about 4 carbon atoms, and $R_5$ and $R_6$ may be the same or different and each is hydrogen or an alkyl radical having 1 to about 4 carbon atoms.

The present invention further provides a method for producing an implantable biological device that encapsulates and immunoisolates biologically active moieties and can be implanted into a host individual, comprising the steps of forming an amphiphilic network comprising the reaction product of hydrophobic crosslinking agents and hydrophilic monomers, wherein said hydrophobic crosslinking agents are multi-arm multi-telechelic polyisobutylene stars having acrylate or methacrylate end caps and represented by formula (I):

(I)

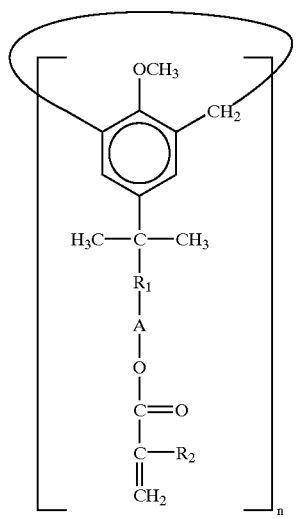

wherein $R_1$ is polyisobutylene represented by formula (II):

(II)

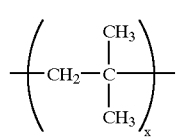

wherein x is the degree of polymerization of said polyisobutylene;

wherein $R_2$ is either H or $CH_3$;

wherein A is a moiety that connects $R_1$ to said acrylate or methacrylate end caps;

wherein n is an integer from 4 to 16; and wherein said hydrophilic monomers are derived from an acrylate selected from the group consisting of formulas (III), (IV) and (V):

(III)

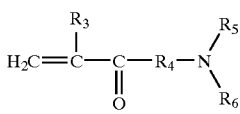

(IV)

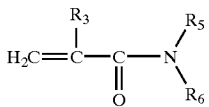

(V)

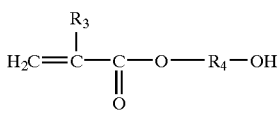

wherein $R_3$ is hydrogen or methyl, $R_4$ is an alkylene group having from about 2 to about 4 carbon atoms, and $R_5$ and $R_6$ may be the same or different and each is hydrogen or an alkyl radical having 1 to about 4 carbon atoms; and forming said amphiphilic network into a desired three-dimensional geometric shape.

The present invention further provides a method for treating Type I diabetes in a diabetic host individual comprising the steps of providing an amphiphilic network comprising the reaction product of hydrophobic crosslinking agents and hydrophilic monomers, wherein said hydrophobic crosslinking agents are multi-arm multi-telechelic polyisobutylene stars having acrylate or methacrylate end caps and represented by formula (I):

(I)

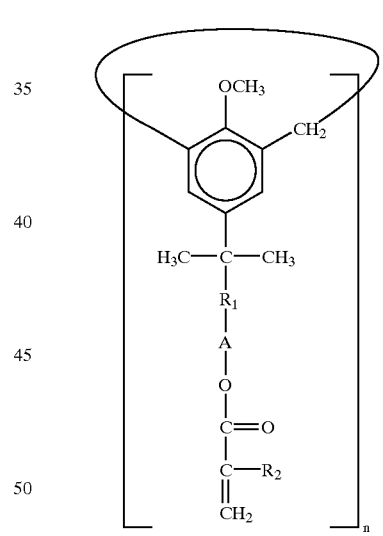

wherein $R_1$ is polyisobutylene represented by formula (II):

(II)

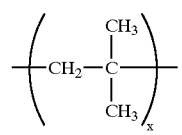

wherein x is the degree of polymerization of said polyisobutylene;

wherein $R_2$ is either H or $CH_3$;

wherein A is a moiety that connects $R_1$ to said acrylate or methacrylate end caps;

wherein n is an integer from 4 to 16; and
wherein said hydrophilic monomers are derived from an acrylate selected from the group consisting of formulas (III), (IV) and (V):

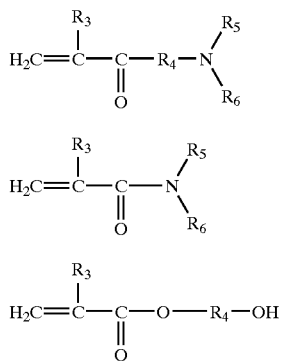

(III)

(IV)

(V)

wherein $R_3$ is hydrogen or methyl, $R_4$ is an alkylene group having from about 2 to about 4 carbon atoms, and $R_5$ and $R_6$ may be the same or different and each is hydrogen or an alkyl radical having 1 to about 4 carbon atoms; forming said amphiphilic network into an elongated tubular device; encasing a sufficient amount of islet of pancreatic cells within said tubular device, wherein said tubular device is capable of immunoisolating said encased islet cells upon implantation into a diabetic-host individual; implanting said device into said diabetic-host individual; and allowing said implanted tubular device to remain implanted in said diabetic-host individual for a time sufficient to normalize the blood glucose level in said diabetic-host individual.

BRIEF DESCRIPTION OF THE DRAWINGS

FIG. 5 is a schematic representation of an implantable tubular biological device prepared from the amphiphilic polymer networks of the present invention.

FIG. 6 is a schematic representation of a cross section of an implantable tubular biological device of the present invention depicting biologically active moieties encased within an amphiphilic network.

DETAILED DESCRIPTION OF THE INVENTION

Figure 1:
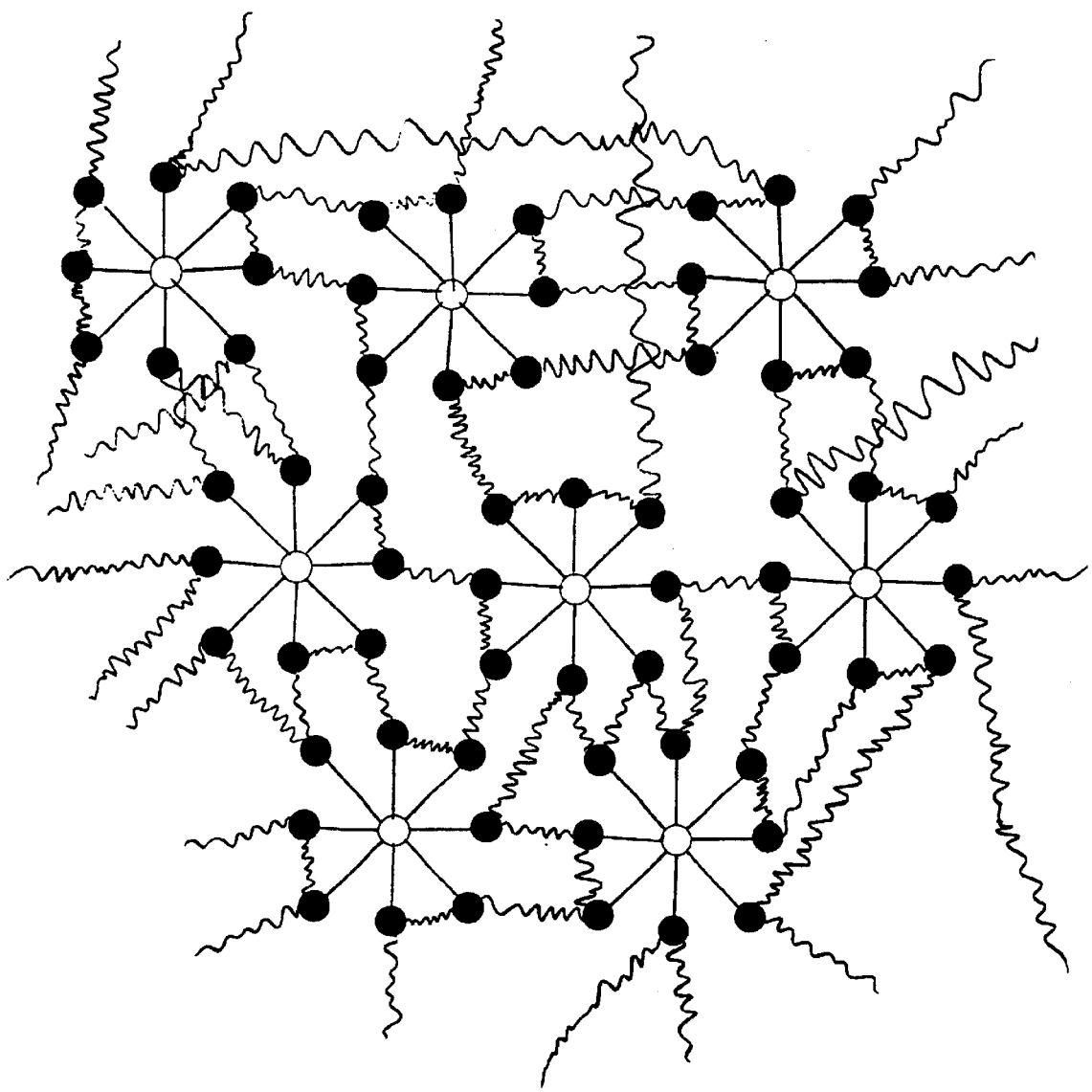
FIG. 1 is a schematic representation of the amphiphilic network of the present invention based on multi-arm multi-telechelic polyisobutylene stars having methacrylate end caps ($\emptyset(PIB-MA)_8$).

Amphiphilic networks have been synthesized that comprise the reaction product of hydrophobic crosslinking agents such as acrylate-capped and methacrylate-capped multi-arm multi-telechelic polyisobutylene stars and hydrophilic monomers such as polyacrylates and polymethacrylates. The networks are characterized by having homogenous and heterogenous crosslink points, and they swell in both polar and nonpolar solvents. When these networks are swollen, they exhibit superior mechanical properties, such as greater tensile strength and elongation in comparison to prior art's amphiphilic networks. Implantable immunoisolatory biological devices comprising the amphiphilic networks of the present invention are biocompatible, hemocompatible, sterilizible, exhibit excellent biostability, and are retrievable from a host individual after implantation.

To assist in understanding the present invention's amphiphilic networks, a glossary of terms and definitions that are used throughout the specification are provided below.

The term "individual," refers to a human or animal subject.

The phrase "biologically active moiety or moieties," refers to any biological material, biological substance, or pharmacological agent that can alter, modify, or elicit a physiological response from a host individual. Preferred examples of biologically active moieties are described hereinbelow.

The term "immunoisolatory," refers to the capability of the amphiphilic polymer networks and implantable biological devices of the present invention to isolate or otherwise protect implanted biologically active moieties from the immunological response of a host individual. The term "immunoisolatory" can also refer to the ability of the amphiphilic network to selectively regulate the passage of molecules through the network.

The term "biocompatible," refers to the capability of the amphiphilic polymer networks and implantable biological devices of the present invention to avoid eliciting a detrimental physiological response from the host individual after implantation, such that the implanted network or device is not rejected by the host individual.

The term "biostability," refers to the capability of the amphiphilic polymer networks and implantable biological devices of the present invention to resist or otherwise withstand the protective physiological responses of the host individual, thus allowing the implanted network and/or device to remain implanted and functional in the host individual for a desired period of time.

The term "hemocompatible," refers to the capability of the amphiphilic networks and biological devices of the present invention to avoid eliciting a detrimental response from the blood of the host individual.

The phrase "homogenous crosslink points," refers to crosslink points connecting only hydrophobic monomer segments in the amphiphilic polymer networks of the present invention. The "homogenous crosslink points" are located at the core of the multi-arm multi-telechelic star hydrophobic crosslinking agent.

The phrase "heterogenous crosslink points," refers to crosslink points connecting hydrophobic monomers to hydrophilic monomers in the amphiphilic polymer networks of the present invention.

The term "permeability," refers to the ability of molecules of a certain size to pass into or out of the amphiphilic polymer networks of the present invention. Thus, increasing the permeability of the polymer network refers to the ability of the polymer network to allow the passage of larger molecules through or across the device. Decreasing the permeability of the polymer network refers to the polymer network's ability to restrict the passage of relatively smaller molecules through or across the network.

The term "$M_{n\ hydrophobic}$," refers to the number-average molecular weight as determined by GPC of the hydrophobic moieties employed in the amphiphilic polymer networks of the present invention.

The term "$M_{n\ hydrophilic}$," refers to the number-average molecular weight of the hydrophilic moieties employed in the amphiphilic polymer networks of the present invention.

The abbreviation "$M_{c\ hydrophilic}$," refers to the calculated molecular weight of the hydrophilic segments between two heterogenous crosslink points in the present invention's amphiphilic networks.

The abbreviation "$M_{c\ hydrophobic}$," refers to the calculated molecular weight of the hydrophobic crosslinking segments between homogenous and heterogenous crosslink points in the amphiphilic polymer networks of the present invention.

The present invention is further described with respect to the synthesis and resulting amphiphilic polymer networks derived from methacrylate-capped multi-arm multi-telechelic polyisobutylene stars (Ø(PIB-MA)$_n$) and polyacrylates such as N,N-dimethylacrylamide (DMAAm), 2-(dimethylamino)ethyl methacrylate (DMAEMA) and 2-hydroxyethyl methylmethacrylate (HEMA). A preferred amphiphilic polymer network is synthesized from Ø(PIB-MA)$_8$ and DMAAm.

The starting materials used in preparing this invention's amphiphilic polymer networks are: (a) hydrophobic multi-arm multi-telechelic polyisobutylene stars having acrylate or methacrylate end caps and (b) hydrophilic ω (di-alkylamino) lower alkyl acrylate/methacrylate or hydrophilic dialkyl acrylamide/methacrylamide or hydrophilic ω-hydroxy alkyl acrylate/methacrylate monomers.

The stars that are used as crosslinking agents are represented by formula (I):

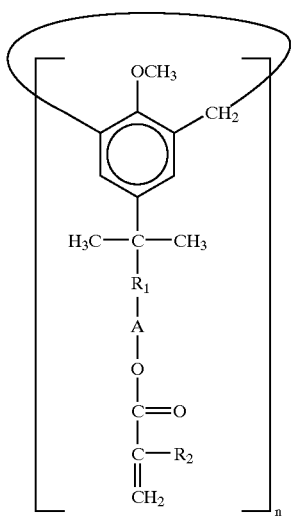

(I)

wherein R$_1$ is polyisobutylene represented by formula (II):

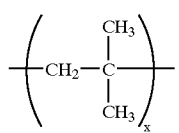

(II)

wherein x is the degree of polymerization of said polyisobutylene;

wherein R$_2$ is either H or CH$_3$;

wherein A is a moiety that connects R$_1$ to said acrylate or methacrylate end caps; and wherein n is an integer from 4 to 16.

The hydrophobic crosslinking agents are multi-arm multi-telechelic polyisobutylene stars having a number-average molecular weight (g/mol) $M_{n\ hydrophilic}$ of at least about 2,000, preferably from about 2,000 to about 100,000 and more preferably from about 15,000 to about 52,000; they therefore have a degree of polymerization x corresponding to this $M_n$ (i.e., x is preferably from about 35 to about 100).

A preferred embodiment for the hydrophobic crosslinking agent is octa-methacrylate-telechelic polyisobutylene star:

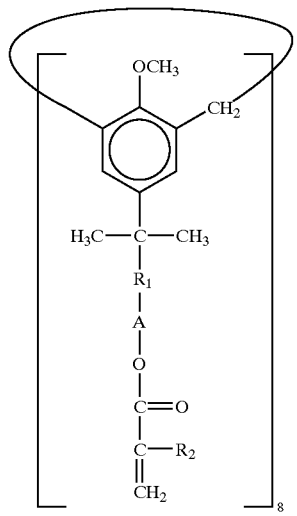

wherein R$_1$ is polyisobutylene represented by formula (II):

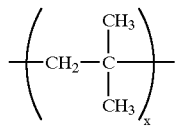

(II)

wherein x is the degree of polymerization of said polyisobutylene; and wherein A is a moiety that connects R$_1$ to the methacrylate end caps.

Moiety A can be any moiety that connects R$_1$ to the acrylate or methacrylate end caps on each arm of the multi-arm multi-telechelic polyisobutylene star crosslinking agent. Suitable moieties that can comprise moiety A include, but are not limited to moieties represented by formulas (VI) and (VII):

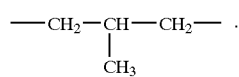
(VII)

The multi-arm multi-telechelic hydrophobic star polymer crosslinking agents can be prepared using conventional techniques. The following synthetic route has been and can be used in preparing the octafunctional initiators 5, 11, 17, 23, 29, 35, 41, 47-(2-hydroxypropyl)-49, 50, 51, 52, 53, 54, 55, 56-octamethoxycalix[8]arene and 5, 11, 17, 23, 29, 35, 41, 47-(2-methoxypropyl)-49, 50, 51, 52, 53, 54, 55, 56-octamethoxycalix[8]arene.

Step 1

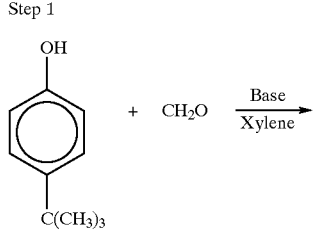

Step 2

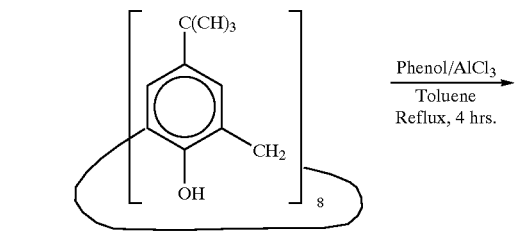

Step 3

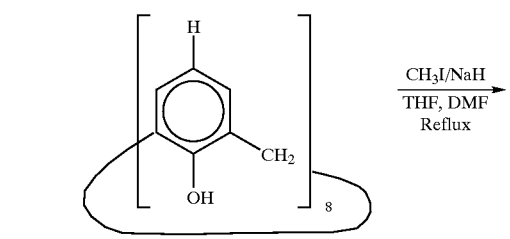

Step 4

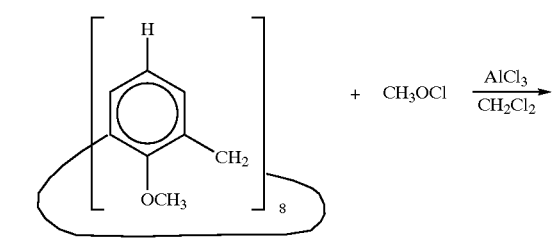

Step 5

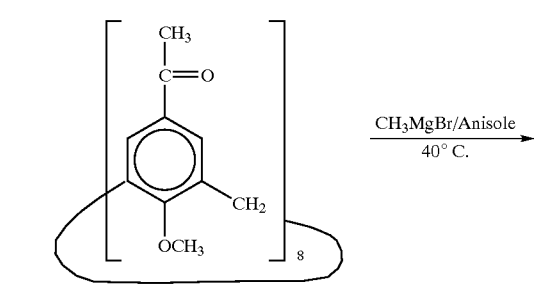

Step 6

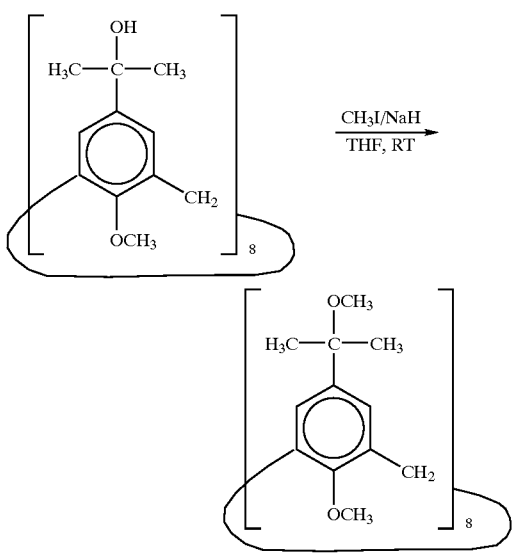

The first step involves the cyclic condensation of p-tert-butylphenol and p-formaldehyde in the presence of KOH to obtain the octafunctional, 5, 11, 17, 23, 29, 35, 41, 47-octa-tert-butyl-49, 50, 51, 52, 53, 54, 55, 56-octahydroxycalix[8]arene. The second step is the dealkylation of the p-tert-butyl group by $AlCl_3$ in the presence of phenol in toulene to give 49, 50, 51, 52, 53, 54, 55, 56-octahydroxycalix[8]arene. The third step involves protection of the —OH group as the methyl ether to afford 49, 50, 51, 52, 53, 54, 55, 56-octamethoxycalix[8]arene, which enables the subsequent Freidel-Crafts acylation to 5, 11, 17, 23, 29, 35, 41, 47-(octaacetyl)-49, 50, 51, 52, 53, 54, 55, 56-octamethoxycalix[8]arene.

Nonlimiting examples of isobutylene polymerizations using the octafunctional initiators are presented; these polymerizations create the star polymer's polyisobutylene arms. Specifically, initiator 5,11,17,23,29,35,41,47-(2-hydroxypropyl)-49,50,51,52,53,54,55,56-octamethoxycalix[8]arene, 0.0516 g ($3.6 \times 10^5$ mol), was suspended in 8 mL $CH_3$ Cl, and then $BCl_3$ 0.68 mL (0.32M), was added. The charge aged 5 minutes, then DMA ($1.98 \times 10^2$M) and DtBP ($4.97 \times 10^3$M) were added, and after 10 minutes, 1.5 mL (33% of the required amount) isobutylene was added to start the polymerization. After 2 hours, 14 mL hexanes, $TiCl_4$ ($4.97 \times 10^2$M), and the remaining amount of isobutylene (2.5 mL) was added. After one hour, the polymerization was terminated with prechilled methanol and the product worked-up as described above. GPC analysis showed the presence of two major products: star polymer ~70% and a side product ~30%. The star polymer was isolated from the mixture by fractionation using hexanes as the solvent and acetone as the precipitating agent.

In a similar polymerization using a 5,11,17,23,29,35,41,47-(2-methoxypropyl)-49,50,51,52,53,54,55,56-octamethoxycalix[8]arene/$BCl_3$—$TiCl_4$ initiating system instead of the 5,11,17,23,29,35,41,47-(2hydroxypropyl)-49,50,51,52,53,54,55,56-octamethoxycalix[8]arene/$BCl_3$—$TiCl_4$ initiating system, the two-stage procedure was again carried out, except by the use of initiator 5,11,17,23,29,35,41,47-(2-methoxypropyl)-49,50,51,52,53,54,55,56-octamethoxycalix[8]arene. Different polymerization conditions were employed in optimizing the process.

Methacrylate or acrylate end functionalization of the polyisobutylene arms can be achieved by conventional methods. A conventional nonlimiting exemplary method of functionalization involves dissolving 20 g of telechelic PIB-diol in 180 ml CH$_2$Cl$_2$ and adding 20 ml CHCl$_3$ to 30 ml triethylamine. Then 15 ml of freshly distilled methacryloyl chloride is added dropwise to the charge at 0° C. under a nitrogen atmosphere, and the mixture is then stirred overnight at room temperature.

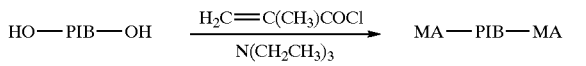

The solvents, triethylamine, and methacryloyl chloride are removed by a rotary evaporator and 50 ml n-hexane is added to the product. The solution is poured into an excess (approximately 500 ml) of acetone and the precipitation is repeated to completely remove triethylamine and methacryloyl chloride. The precipitate is dissolved in n-hexane and washed with methanol. A small amount of water is added to ascertain the separation between n-hexane and methanol. The n-hexane solution is dried over MgSO$_4$ and the product is then recovered by evaporating the solvent. Synthesis of methacryloyl-capped polyisobutylene is described in J. P. Kennedy and M. Hiza, Polymer Bulletin. Vol. 10, pages 146–151 (1983), which is herein incorporated by reference.

The hydrophilic comonomers are derived from a monofunctional monomer or mixture thereof that is copolymerizable with the acrylate or methacrylate end groups of the hydrophobic acrylate-capped or methacrylate-capped multi-arm multi-telechelic polyisobutylene star, and which yields a water soluble segment when homopolymerized. Preferred hydrophilic polyacrylate segments are those derived from acrylate monomer of formulas (III), (IV), and (V) as shown below:

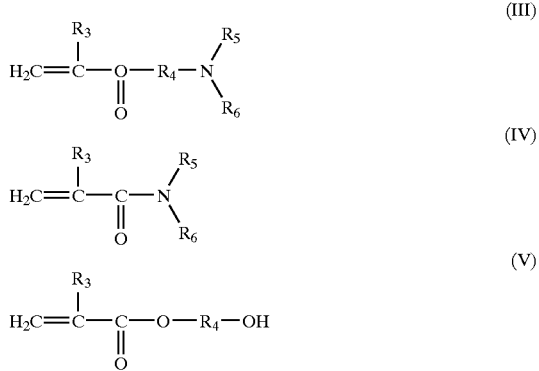

where R$_3$ is hydrogen or methyl, R$_4$ is an alkylene group of 2 to about 4 carbon atoms, and R$_5$ and R6 may be the same or different and each is hydrogen or an alkyl radical having from about 1 to about 4 carbon atoms.

The preferred acrylate of the formula (III) is 2-(dimethylamino)ethyl methacrylate (DMAEMA). The preferred acrylates of formulas (IV) and (V) for controlled and/or sustained drug release networks are N,N-dimethylacrylamide (DMAAm) and 2-hydroxyethyl methacrylate (HEMA), respectively. Other suitable hydrophilic comonomers include N-vinyl pyrrolidone, acrylamide and other similar hydrophilic acrylates or methacrylates.

Preferably the hydrophobic crosslinking agent (I) and the hydrophilic comonomer, which is derived from formula III, IV, or V, have the same ester group, which is preferably methacrylate, so that the amphiphilic polymer network that is formed will be a random copolymer.

The preferred hydrophilic moiety of the amphiphilic network comprises PDMAAm and the M$_{n,\ PDMAAm}$ is at least about 300 g/mol, preferably from about 300 g/mol to about 15,000 g/mol, and most preferably from about 1,800 g/mol to about 7,000 g/mol.

The respective weight ratio of the hydrophobic monomer to the hydrophilic comonomer is in the range of about 80:20 weight percent to about 20:80 weight percent, preferably in the range of about 70:30 weight percent to about 30:70 weight percent, and more preferably in the range of about 60:40 weight percent to about 40:60 weight percent, and most preferably in the range of about 50:50 weight percent.

When the reaction between the hydrophobic and hydrophilic monomers is complete, the reaction product may be extracted sequentially with a non-polar solvent such as n-hexane, a polar organic solvent such as methanol, and water to respectively remove the unreacted hydrophobic crosslinker, which may be Ø(PIB-MA)$_n$, the unreacted hydrophilic comonomer, which may be DMAAm, and the hydrophilic homopolymer, which may be PDMAEMA. After performing these extractions, only the amphiphilic network remains.

A schematic representation of an amphiphilic polymer network of the present invention, which employs multi-arm multi-telechelic star Ø(PIB-MA)$_8$ polymers, is shown in FIG. 1. The straight lines represent the hydrophobic Ø(PIB-MA)$_8$ segments, and the wavy lines represent the hydrophilic polyacrylate segments. The "open" circles represent homogenous crosslink points, and the darkened circles represent heterogenous crosslink points. As can be seen from FIG. 1, the amphiphilic polymer networks of the present invention have two types of crosslink points, namely homogenous crosslink points and heterogenous crosslink points, and are characterized by two distinct M$_c$s. At the core of the Ø(PIB-MA)$_8$ segments is a homogenous crosslink point, only crosslinking hydrophobic segments. The incorporation of the Ø(PIB-MA)$_8$ into the growing hydrophiphilic PDMAAm segments creates the heterogenous crosslink points, which connect the hydrophilic segments to the hydrophobic segments. M$_{c,\ PIB}$ is the calculated molecular weight of one arm of the multi-arm star polyisobutylene segment between crosslink points, and M$_{c,\ PDMAAm}$ is the calculated molecular weight of the hydrophilic PDMAAm segment between two heterogeneous crosslink points.

The molecular weights of the crosslinking agents (M$_{n,PIB}$) were determined by GPC and the M$_n$ of the PDMAAm segments between crosslinking sites (M$_{c,\ hydrophilic}$) was calculated by:

$$M_{c,hydrophilic} = \frac{W_{PDMAAm} \times M_{n,PIB}}{F \times W_{PIB}}$$

where W$_{PDMAAm}$ and W$_{PIB}$ are the weight fractions of PDMAAm and PIB in the networks, and F is the functionality of the crosslinker, which is preferably 8.

Table 1, hereinbelow, shows the data for various amphiphilic polymer networks of the present invention. Table 1 summarizes amphiphilic networks prepared with main chains of PDMAAm crosslinked with PIB(MA)$_8$ (#1–4), PIB(MA)$_3$ (#5–7), and PIB(MA)$_2$ (#8–9) crosslinkers. Abbreviations in the second column indicate the main chain (A=PDMAAm), the functionality of the crosslinker (i.e., 8, 3, or 2) followed by the $M_n$(×1000) of the crosslinker, the weight % PIB, and the $M_n$ of the PDMAAm segment between crosslinks ($M_{n,hydrophilic}$) (×1000).

TABLE 1

Synthesis and characterization of amphiphilic networks

| # | Network | $M_{n,PIB}$* g/mol (PDI) | $M_{n,Hi}$** g/mol | Mole ratio MA/DMAAm in charge | Sol Fraction, S, % | | Swelling Ratio, $d_{sw}$ (Swelling rate) ($d_{sw}$/min) | |
|---|---|---|---|---|---|---|---|---|
| | | | | | $nC_6H_{14}$ | $CH_3OH$ | $H_2O$ | $nC_7H_{16}$ |
| 1 | A8-15-50-1.9 | 15000 (1.08) | 1875 | 0.053 | 1.41 | 1.78 | 1.39 (0.045) | 0.63 (0.023) |
| 2 | A8-25-50-3.1 | 25000 (1.11) | 3125 | 0.032 | 1.64 | 1.72 | 1.40 (0.042) | 0.70 (0.025) |
| 3 | A8-34-50-4.0 | 34000 (1.09) | 4250 | 0.024 | 1.8 | 2.02 | 1.67 (0.05) | 0.76 (0.027) |
| 4 | A8-52-50-6.5 | 52000 (1.17) | 6500 | 0.016 | 1.88 | 2.24 | 1.81 (0.056) | 0.86 (0.031) |
| 5 | A3-4-50-1.5 | 4000 (1.12) | 1330 | 0.075 | 4.25 | 2.59 | 0.69 | 0.42 |
| 6 | A3-10-50-3.3 | 10000 (1.1) | 3330 | 0.029 | 5.10 | 4.63 | 0.79 | 0.6 |
| 7 | A3-15-50-5.0 | 15000 (1.08) | 5000 | 0.019 | 6.35 | 5.59 | 0.88 | 0.6 |
| 8 | A2-4.5-50-2.2 | 4500 | 2250 | 0.044 | 6.3 | 3.5 | 0.76 | 0.14 |
| 9 | A2-9.5-50-4.8 | 9500 | 4750 | 0.021 | 3.1 | 6.6 | 0.81 | 0.37 |

*Methacrylate-telechelic crosslinkers: $PIB(MA)_8$, $PIB(MA)_3$, and $PIB(MA)_2$
**$M_{n,hydrophilic} = M_{n,PDMAAm}$ The amount of sol fraction (i.e., extractables) is a good indication of the extent of crosslinking and less than 15% sol indicates satisfactory crosslinking. As expected, $PIB(MA)_8$ consistently produced the highest crosslinking efficiency (S<2%) indicating essentially complete incorporation of the starting materials to the networks.

The present invention's amphiphilic polymer networks are swellable in both polar solvents such as water, and non-polar solvents such as n-heptane, but are not soluble in either. Although the present invention has been described with particular reference to amphiphilic networks comprising the reaction product of telechelic multi-arm star $Ø(PIB)_n$ and hydrophilic DMAAM, other networks according to the present invention in which the hydrophilic polymer chains are based on a monomer other than DMAAm, exhibit similar swellability in both water and n-heptane as the preferred amphiphilic network.

As discussed hereinabove, the present invention also provides for implantable biological devices that can encapsulate biologically active moieties. The devices further immunoisolate said moieties from the immunological response of a host individual employing the swellable amphiphilic polymer networks of the present invention.

In order for the biological device of the present invention to encase and immunoisolate biologically active cells and substances, the amphiphilic polymer network of the present invention is typically formed into a desired three-dimensional structure. The biological device having a three-dimensional structure is constructed to have a particular volume for encasing and immunoisolating biologically active cells and substances.

Although any size, shape, configuration or structure can be employed, it is preferred that the size, shape, or configuration of the biological device be such that it will allow as non-invasive a medical procedure as possible to implant the device in a host individual. A preferred geometric structure comprises an elongated cylindrical or tubular structure having opposing ends adapted to be sealed, thus capable of forming an implantable biological device having an inner volume for encasing and immunoisolating biologicaly active cells and substances. With reference to FIG. 5, the preferred tubular biological device (10) comprising the amphiphilic network (11) of the present invention is shown. The opposing ends (12,13) of the tubular biological device are pinched to seal the inner volume. The opposing ends (12,13) can be sealed using an adhesive, such as cyanoacrylate and the like. With reference to FIG. 6, a cross section of tubular biological device (10) shows the device comprising the amphiphilic network (11) of the present invention. The inner volume of the tubular device (10) contains a desired amount of biologically active moieties (15), such as islet cells. The inner volume of the tubular device (10) may also contain a matrix (14), such as an alginate matrix, to prevent the aggregation of the moieties within the inner volume of the tubular device (10).

The thickness of the amphiphilic membrane of a tubular shaped biological device is preferably from about 0.001 centimeters to about 0.1 centimeters, more preferably from about 0.003 centimeters to about 0.08 centimeters, and most preferably form about 0.005 centimeters to about 0.02 centimeters thick.

The length of a tubular shaped biological device comprising the amphiphilic networks described hereinabove is from about 1 to about 50 centimeters, preferably less than about 20 centimeters in length, more preferably less than about 10 centimeters in length, and most preferably from about 2 centimeters to about 5 centimeters in length.

The inner volume of a 4 centimeter (cm) long tubular biological device of the present invention is preferably less than about 0.1 milliliters.

The outer diameter of a tubular shaped biological device comprising the amphiphilic networks described hereinabove is preferably less than about 3 millimeters, more preferably less than about 2 millimeters, and most preferably less than about 1 millimeter.

The present invention also provides a method of forming an amphiphilic network that is swellable in water and n-heptane. The process for forming the amphiphilic network includes copolymerizing and crosslinking hydrophilic monomers with hydrophobic acryloyl or methacryoyl-capped polyisobutylene monomers, such as multi-arm multi-telechelic star methacrylate-capped polyisobutylene Ø(PIB-MA)$_n$. A nonlimiting preferred embodiment is presented in FIG. 8.

Figure 8:
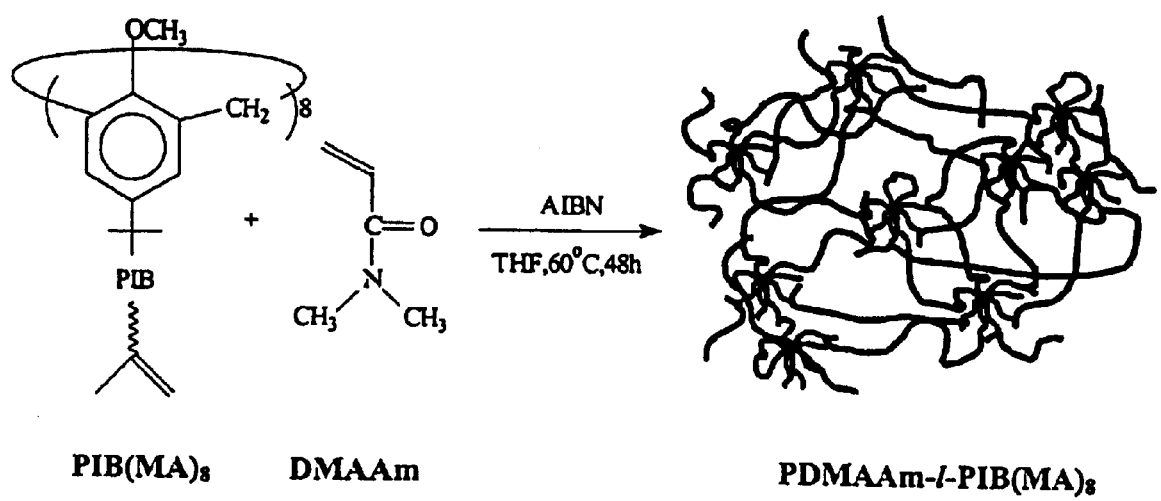
FIG. 8 is a schematic representation of the chemical reaction of PDMAAm with PIB(MA)$_8$ in order to form an amphiphilic network.

With the preferred embodiment presented in FIG. 8, implantable thin-walled tubular amphiphilic networks suitable for encasing and immunoisolating biological matter are formed by simultaneous free radical copolymerization in a horizontally disposed rotating glass tube in a thermostatted oven. The glass reactor tube is generally characterized as having a length of about 20 to about 25 centimeters and an inner diameter of about 0.05 to about 2 millimeters. The simultaneous free radical copolymerization and crosslinking is carried out in a suitable organic solvent, such as tetrahydrofuran (THF) and a suitable initiator, such as azobisisobutyronotrile (AIBN). The glass tube is sealed under nitrogen, and rotated at about 200 to about 400 RPM at a temperature of about 60° C. to about 65° C. The centrifugal force moves the active charge to the wall of the rotating tube. The reaction is carried out for up to about two days. The glass reactor tube is opened, and the tubular amphiphilic network is removed from the glass tube, and washed sequentially with hexanes, alcohol and water each for 24 hours at room temperature.

The implantable biological devices comprising the amphiphilic networks of the present invention are capable of encasing biologically active moieties and immunoisolating the encased moieties from the immunological response of the host individual after implantation.

The amphiphilic polymer networks of the present invention are hydrogels that, in the hydrated state, are similar to natural tissue. As a result of this characteristic, the amphiphilic polymer networks and biological devices prepared with them have a broad range of biomedical applications. The amphiphilic polymer networks and biological devices prepared from the networks may be used in biomedical applications including, but not limited to, implantable biological devices for encasing biologically active cells and substances, implantable biological devices for immunoisolating encased biologically active moieties from the immune response of an individual, controlled drug release, implants for enzyme immobilization, artificial arteries, blood-contacting applications, various implantable reservoirs for a pharmacologically active agent, in both human and veterinary applications. Biologically active moieties include, but are not limited to, cells, tissue, hormones, enzymes, growth factors, and erythropoietin.

Without limiting the present invention in any manner, the preferred biologically active moieties are pancreatric Lagerhans islet cells that will be used to normalize the blood/glucose level in an individual suffering from Type I diabetes.

In one preferred embodiment of the present invention, essentially water soluble sodium alginate is introduced into the inner volume of the implantable biological device along with biologically active moieties. The biological device is then placed into a solution of calcium chloride. Preferably, the calcium chloride solution is a 2.0 weight percent aqueous solution of calcium chloride. The calcium chloride penetrates the amphiphilic network into the biological device to crosslink the sodium alginate. The crosslinked sodium alginate forms a loose gel which substantially prevents aggregation of the moieties within the biological device. It is important to note that the addition of the crosslinked alginate matrix to the inner volume of the biological device of the present invention does not effect the permeability or immunoisolatory properties of the amphiphilic polymer networks.

Pharmacologically active agents are any agent or combination of agents that suppress, modify, alter, or otherwise cause an in vivo physiological response. Suitable pharmacologically active agents that may be encased within the inner volume of the biological devices of the present invention include, but are not limited to, insulin, antifungal agents, antibacterial agents, anti-viral agents, growth factors and hormones.

As mentioned hereinabove, the present invention provides a method for treating Type I diabetes. The treatment involves providing the amphiphilic network of the present invention. The amphiphilic network is formed into an elongated tubular device that can be implanted into a diabetic host individual. A sufficient amount of pancreatic beta cells are encased within said tubular biological device. The biological device containing the pancreatic beta cells is then implanted into a diabetic individual. The implanted biological device is allowed to remain implanted in the host diabetic individual for a time sufficient to normalize the blood/glucose level in the diabetic individual.

It is important to note that implantable biological devices prepared from the amphiphilic networks described herein are capable of immunoisolating the encased biologically active cells from the immune response of the diabetic individual. The tubular biological device allows passage of glucose into the device to stimulate production of insulin by the encased cells. The biological device allows passage of the insulin produced by the encased cells out of the device.

With respect to the treatment of Type I diabetes, it has been found that preferably about 700,000 to about 1,000,000 pancreatic islet cells are required to normalize, to about 100 mg/ml, the blood glucose level of an 80 kilogram human, thus reversing the effects of diabetes in an individual. This determination is generally based on the assumption that about 10,000 pancreatic islet cells per kilogram of body weight is desirable. Accordingly, the treatment of Type I diabetes using the biological device or devices as disclosed herein should achieve this level either by providing the appropriate amount of pancreatic islet cells based on the body weight of the individual, or providing an amount of islet cells sufficient to supplement the individual's active insulin-producing pancreatic islet cells.

As mentioned hereinabove, biological device or devices comprising the amphiphilic network of the present invention are typically implanted in a diabetic individual. It is preferable that the most non-invasive technique of implantation be employed. A non-invasive technique generally refers to a procedure that causes minimal pain, discomfort, and recovery time of the individual into which the device is implanted. Given the relatively small diameter and length of the biological devices of the present invention, only a minimal incision is required to implant the device. It is further envisioned that a very narrow cylindrical device, as described hereinabove, could be implanted by injection utilizing a syringe of sufficient size. It should also be appreciated that several devices can be implanted simultaneously into the body of a diabetic individual to achieve the desired cell count necessary to reverse the effects of diabetes.

GENERAL EXPERIMENTAL

The following examples are set forth to describe the present invention's amphiphilic networks in further detail and illustrate the methods of preparation relating thereto. These examples should not be construed as limiting the present invention in any manner. Throughout this specification and claims, all percentages are by weight and are based on the total amphiphilic polymer network weight unless otherwise specifically stated.

Network Synthesis

Synthesis of the multi-arm multi-telechelic polyisobutylene stars having allyl end caps (Ø(PIB-Al)$_8$) was carried out by living cationic polymerization using octamethoxy-calix[8]arene/BCl$_3$/TiCl$_4$/N,N-dimethylacetamide/Dt-BP/hexane/CH$_3$Cl/-80° C. system with end-quenching with allyltrimethylsilane. The allyl-multi-telechelic polyisobutylene was functionalized to (Ø(PIB-MA)$_8$) by the method disclosed by B. Ivan, J. P. Kennedy and V. S. C. Chang, J. Polym. Sci. Polym Chem. Ed. 18, 3177 (1980). The PDMAAm-l-multi-arm polyisobutylene star networks were prepared by AIBN induced free radical copolymerization of DMAAm with (Ø(PIB-MA)$_8$) in tetrahydrofuran at 60° C. for 48 hours. Initiation was accelerated by N,N-dimethyl-p-toluidine. Polymers were extracted sequentially with hexane and methanol for 24 hours to remove unreacted (Ø(PIB-MA)$_8$), DMAAm and PDMAAm, respectively.

The amphiphilic networks of the present invention were evaluated for their ability to swell in n-heptane and distilled water. The tensile properties of the amphiphilic networks of the present invention were also evaluated.

Extraction and Swelling Experiments

These experiments were carried out on 2.5 cm diameter, ~0.45 cm thick membranes. Membranes were prepared by charging 0.1 g DMAAm, 0.1 g PIB(MA)$_8$, and 0.001 g AIBN dissolved in 1 ml THF into 2.5 cm diameter cylindrical vials, flushing with N2, sealing them, and maintaining the system for 2 days at 60° C. Samples were Soxhlet extracted sequentially with n-hexane and methanol for 24 hours. The percent of sol, S, was determined by:

$$S = \frac{W_{sol}}{W_o} \times 100$$

where $w_{sol}$ and $w_o$ are the weights of extracted and starting material, respectively.

The degree of swelling was determined by swelling membranes in water and n-heptane at room temperature until equilibrium. Samples were periodically removed from the swelling media, the excess liquid was removed from the samples by blotting with tissue paper, and the samples were weighed. Degree of swelling, $d_{sw}$ is expressed by:

$$d_{SW} = \frac{(w_s - w_d)}{w_d} \times 100$$

where $w_s$ and $w_d$ are the weights of swollen and dry membranes, respectively. The swelling rates were determined from the initial slopes of degree swelling versus time traces.

Figure 2:
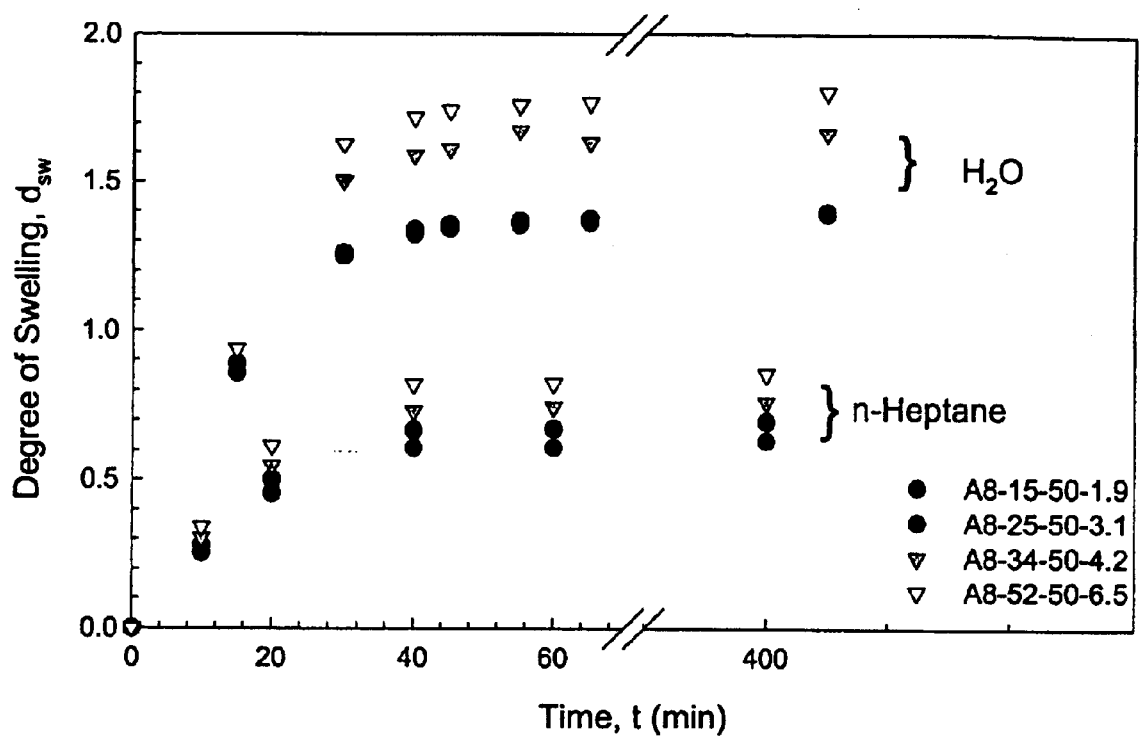
FIG. 2 is a representative graph that illustrates the degree of swelling ($d_{SW}$) of PDMAAm-l-PIB(MA)$_8$ amphiphilic networks in water and n-heptane versus time.

FIG. 2 shows the swelling profiles of the amphiphilic polymer networks of the present invention in water and n-heptane, respectively. FIG. 2 further shows the rates and equilibrium swelling as a function of time. The rates of swelling of PDMAAm-l-PIB(MA)$_8$ in both water and n-heptane were found to be much higher (equilibrium swelling reached in 1 hour) than in compositionally similar membranes (e.g., equilibrium swelling of PDMAAm-l-PIB(MA)$_2$ was reached in both solvents in ~10 hours). Rapid swelling rates are desirable to facilitate materials transport through membranes for immunoisolatory applications.

The water-swollen PDMAAm-l-PIB(MA)$_8$ networks were consistently opaque suggesting massive phase separation between the incompatible PDMAAm and PIB segments and domains that may arise by intermolecular crosslinking between one or several PIB(MA)$_8$ units. In contrast, networks prepared with PDMAAm and PIB(MA)$_3$ or PIB(MA)$_2$ were optically clear, and PEM showed a co-continuous salt-paper morphology with domain diameters in the 20–50A range.

The equilibrium degree of swelling and swelling rates of various membranes in water and n-heptane were investigated. According to the data summarized in Table 1 the swelling PDMAAm-l-PIB(MA)$_8$ in both water and n-heptane is significantly higher than those of membranes crosslinked by PIB(MA)$_3$ and PIB(MA)$_2$. The swelling in water of PDMAAm-l-PIB(MA)$_8$ is at least double that of the other networks even with comparable $M_{c,hydrophilic}$.

Figure 3:
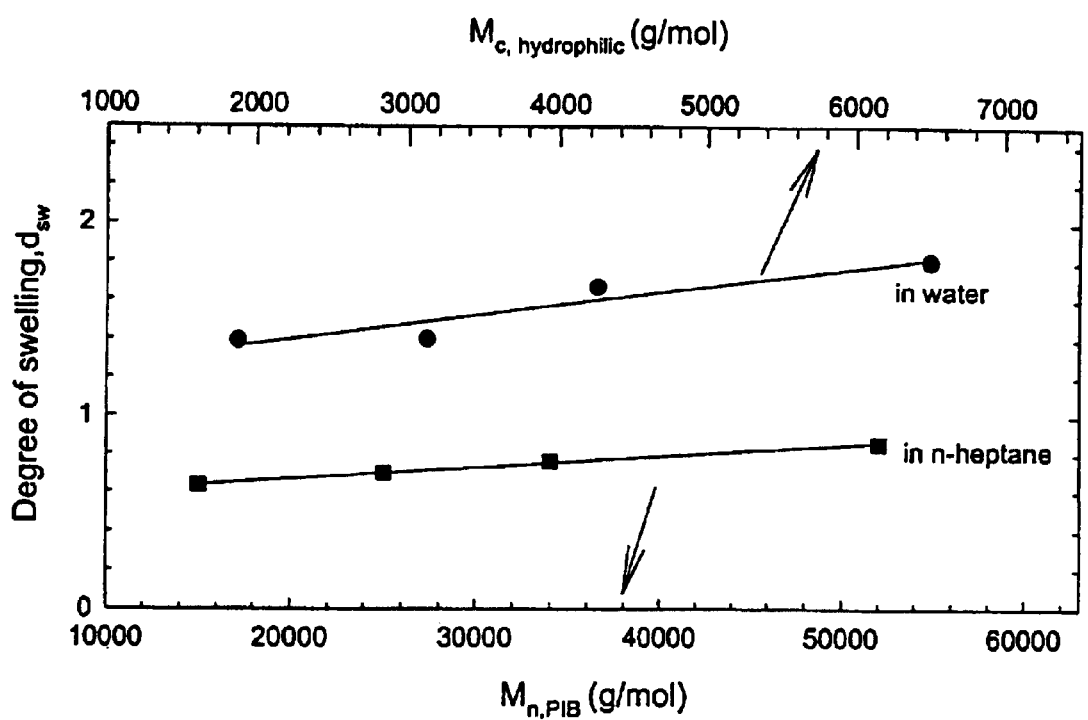
FIG. 3 is a representative graph that illustrates the effect of $M_{c,hydrophilic}$ and $M_{n,PIB}$ on equilibrium swelling of PDMAAm-l-PIB(MA)$_8$ amphiphilic networks.

FIG. 3 summarizes the PDMAAm-l-PIB(MA)$_8$ amphilic-network equilibrium-swelling data obtained from the swelling profiles of FIG. 2. FIG. 3 shows that the network's degree of equilibrium swelling in n-heptane increases as the number-average molecular weight of the PIB arms increase. Likewise, the network's degree of equilibrium swelling in water increases as the calculated molecular weight of the network's hydrophilic segments increases.

Amphiphilic networks, comprising Ø(PIB-MA)$_n$ and poly-DMAAm (PDMAAm), when swollen with water exhibited and degree of swelling, $d_{sw}$ from about 1.3 to about 1.9. When swollen with n-heptane, the amphiphilic networks comprising Ø(PIB-MA)$_n$ and poly-DMAAm (PDMAAm) exhibited a degree of swelling from about 0.5 to about 1.0.

Mechanical Properties

In view of the intended use of our membranes (i.e. immunoisolatory tublar devices) the mechanical properties of water-swollen tubular samples have been determined. The preparation of tubules has been described above. Simple extension experiments were carried out by the incremental application of force, which was increased incrementally (2–10 g) until failure. The engineering stress was obtained by:

$$\sigma = \frac{F}{A_0}$$

where F is the force and $A_0$ is the initial cross-section. The elastic moduli, E, were obtained from the initial slopes of engineering stress-extension traces (10–15% extension).

Table 2, hereinbelow, shows the data for various amphiphilic polymer networks of the present invention. Table 2 summarizes amphiphilic networks prepared with main chains of PDMAAm crosslinked with PIB(MA)$_8$ (#1–4), PIB(MA)$_3$ (#5–7), and PIB(MA)$_2$ (#8) crosslinkers. Abbreviations in the second column indicate the main chain (A=PDMAAm), the functionality of the crosslinker (i.e., 8, 3, or 2) followed by the $M_n$(×1000) of the crosslinker, the weight % PIB, and the $M_n$ of the PDMAAm segment between crosslinks ($M_{n,hydrophilic}$)(×1000).

TABLE 2

Mechanical properties of water-swollen amphiphilic tubules

| # | Network | Eng. Stress, α, Mpa | Elastic Modulus, E, Mpa | Elongation, ε |
|---|---|---|---|---|
| 1 | A8-15-50-1.9 | 0.58 ± 0.1 | 1.03 ± 0.24 | 260 ± 129 |
| 2 | A8-25-50-3.1 | 0.56 ± 0.13 | 0.89 ± 0.09 | 208 ± 39 |
| 4 | A8-52-50-6.5 | 0.40 ± 0.046 | 0.6 ± 0.12 | 249 ± 105 |
| 5 | A3-4-50-1.5 | 0.42 ± 0.2 | 1.6 ± 0.28 | 51 ± 5 |
| 6 | A3-10-50-3.3 | 0.50 ± 0.27 | 0.92 ± 0.21 | 187 ± 46 |
| 7 | A3-15-50-5.0 | 0.49 ± 0.08 | 0.71 ± 0.17 | 263 ± 29 |
| 8 | A2-4.5-50-2.2 | 0.29 ± 0.31 | 0.82 ± 0.23 | 59 ± 69 |

Table 2 shows engineering stress, elastic modulus, and elongation of representative water-swollen tubular membranes prepared from amphiphilic networks comprising Ø(PIB-MA)$_n$ and poly-DMAAm (PDMAAm). The water-swollen tubules are rubbery with elongations from about 160% to about 390%, have stresses at break from about 0.35 Mpa to about 0.8 Mpa, and demonstrate an elastic modulus from about 0.45 Mpa to about 1.3 Mpa.

The water-swollen tubules comprising eight-arm polyisobutylene star crosslinking agents showed improved physical characteristics over those tubules comprising two-arm or three-arm polyisobutylene crosslinking agents. Specifically, the networks comprising the eight-arm PIB stars showed elongations greater than approximately 200% when the $M_n$ of the PIB arms were as low as 1.9. In the networks comprising three-arm PIB stars, elongations greater than approximately 200% were not achieved until the $M_n$ of the PIB arms were approximately 5.0.

Tg Studies

DSC thermograms were recorded by a DuPont 910 DSC in the –100° C. to 200° C. range with 10° C./min heating rate. The traces of trapped water were eliminated by repeating the heating/cooling cycle. The $T_g$'s obtained in the second cycle are reported.

Figure 4:
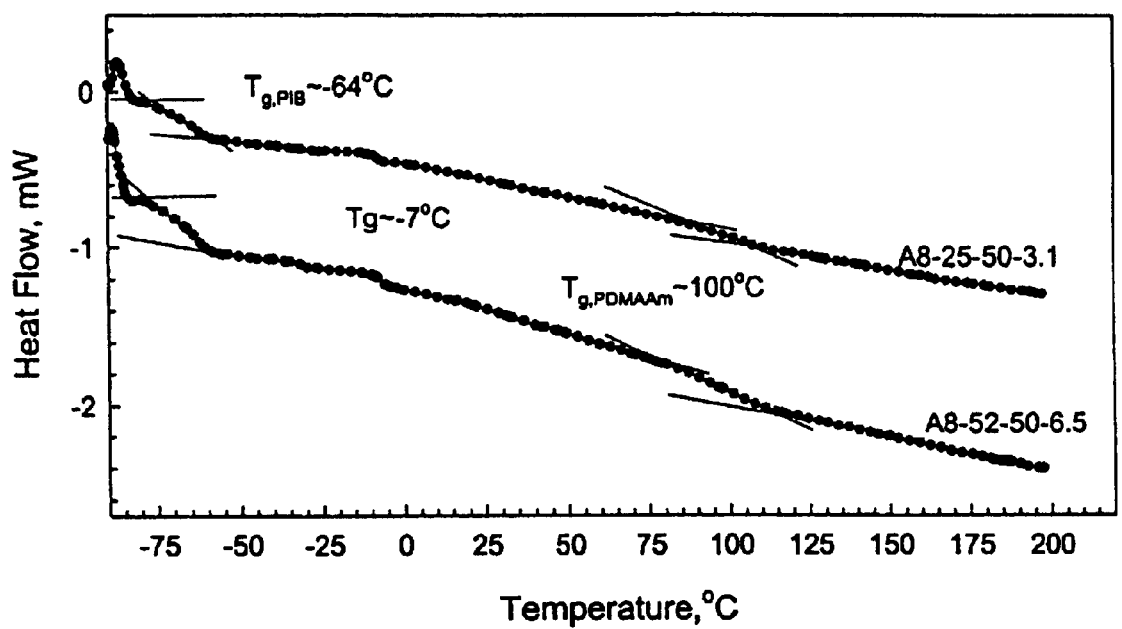
FIG. 4 is a representative graph that illustrates DSC thermograms obtained upon heating of PDMAAm-l-PIB(MA)$_8$ networks from −100° C. to 200° C. at 10° C./minute.
Figures 7A, 7B:
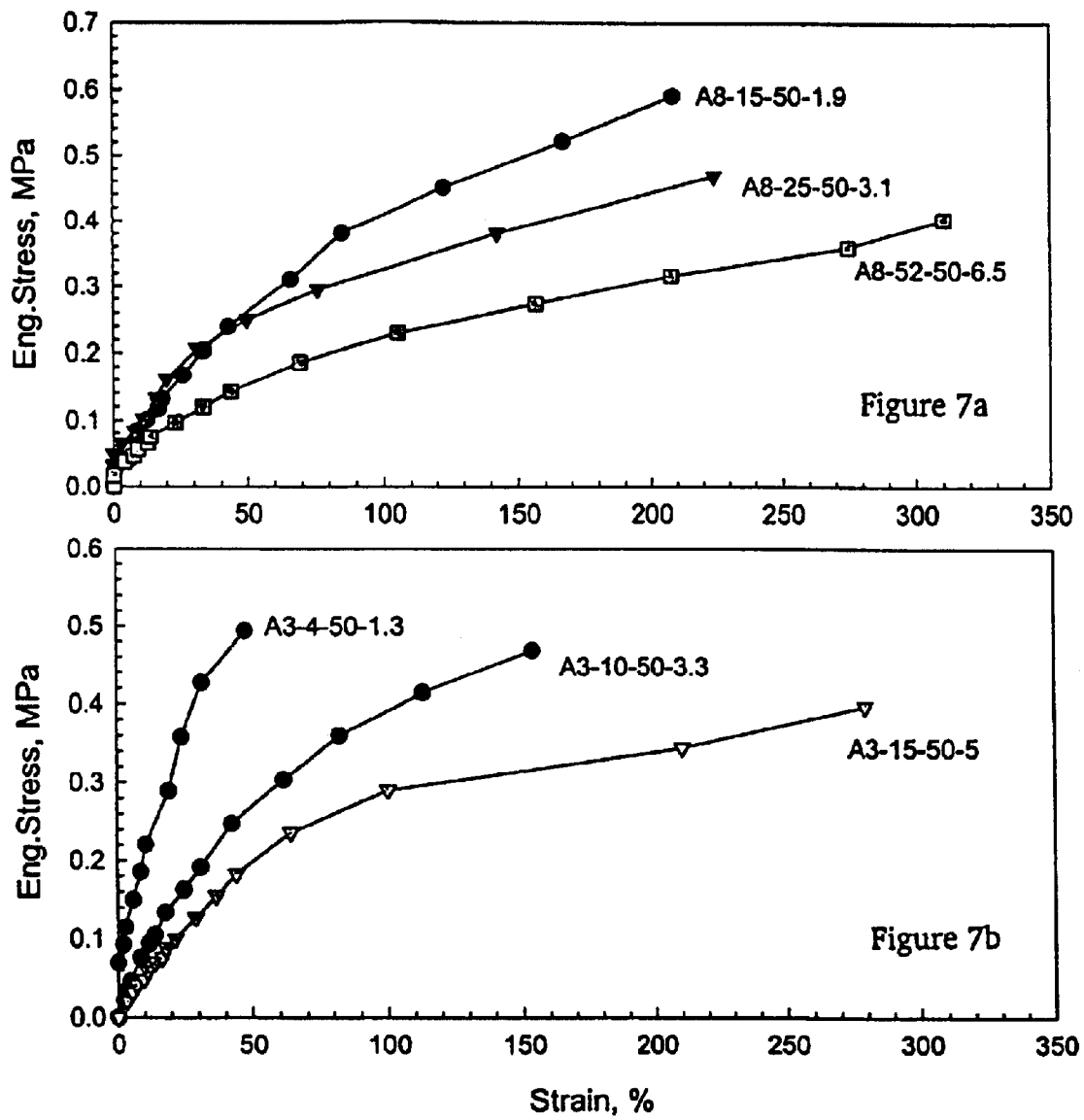
FIGS. 7a and 7b show the stress-strain traces of membranes crosslinked by PIB(MA)$_8$ and PIB(MA)$_3$ respectively, and the effect that crosslinker molecular weight has on stress-strain behavior.

FIG. 4 shows DSC traces of two representative membranes. The $T_g$'s at 64° C. and 100° C. indicate phase separated PIB and PDMAAm domains, respectively. The traces also show a $T_g$ at ~7.5° C. that suggests an interphase. The latter transition is probably not due to water because it persisted in DSC traces obtained with samples cycled to 200° C. three times.

Based on the foregoing disclosure, it is therefore demonstrated that the objects of the present invention are accomplished by the amphiphilic polymer networks and methods of preparation disclosed. The amphiphilic polymer networks of the present invention are particularly well suited for use in implantable biological devices. It is further demonstrated that the present invention provides amphiphilic networks having improved immunoisolatory and mechanical properties as compared to the prior art's amphiphilic networks. It should be understood that the selection of specific hydrophobic crosslinking agents, hydrophilic monomers, and biologically active moieties can be determined by one having ordinary skill in the art without departing from the spirit of the invention herein disclosed and described. It should therefore be appreciated that the present invention is not limited to the specific embodiments described above, but includes variations, modifications and equivalent embodiments defined by the following claims.

We claim:

1. An amphiphilic network comprising the reaction product of hydrophobic crosslinking agents and hydrophilic monomers, wherein said hydrophobic crosslinking agents are multi-arm multi-telechelic polyisobutylene stars having acrylate or methacrylate end caps and represented by formula (I):

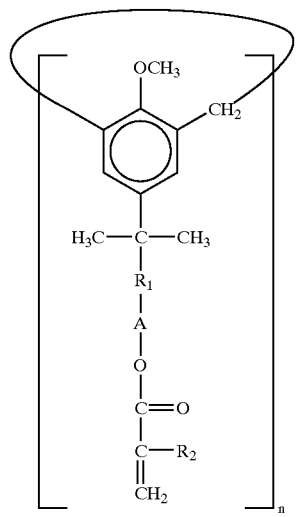

wherein $R_1$ is polyisobutylene represented by formula (II):

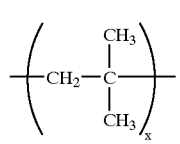

wherein x is the degree of polymerization of said polyisobutylene;

wherein $R_2$ is either H or $CH_3$;

wherein A is a moiety that connects $R_1$ to said acrylate or methacrylate end caps;

wherein n is an integer from 4 to 16; and wherein said hydrophilic monomers are derived from an acrylate selected from the group consisting of formulas (III), (IV) and (V):

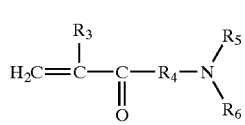

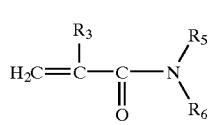

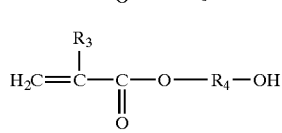

wherein $R_3$ is hydrogen or methyl, $R_4$ is an alkylene group having from about 2 to about 4 carbon atoms, and $R_5$ and $R_6$ may be the same or different and each is hydrogen or an alkyl radical having 1 to about 4 carbon atoms.

2. The amphiphilic network of claim 1, wherein A comprises at least:

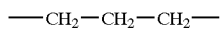 (VI)

or

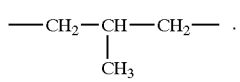 (VII)

3. The amphiphilic network of claim 1, wherein the $M_n$ of said hydrophobic crosslinking agent is at least about 2,000 g/mol.

4. The amphiphilic network of claim 3, wherein the $M_n$ of said hydrophobic crosslinking agent is from about 2,000 g/mol to about 100,000 g/mol.

5. The amphiphilic network of claim 1, wherein the ratio of said hydrophobic crosslinking agent to said hydrophilic monomer is from about 80:20 to about 20:80 by weight.

6. A method of forming an amphiphilic network comprising the steps of:

copolymerizing and crosslinking hydrophilic monomers, wherein said hydrophilic monomers are derived from an acrylate selected from the group consisting of formulas (III), (IV) and (V):

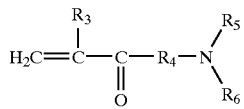 (III)

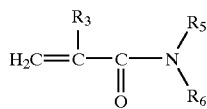 (IV)

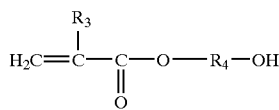 (V)

wherein $R_3$ is hydrogen or methyl, $R_4$ is an alkylene group having from about 2 to about 4 carbon atoms, and $R_5$ and $R_6$ may be the same or different and each is hydrogen or an alkyl radical having 1 to about 4 carbon atoms;

with hydrophobic crosslinking agents, wherein said hydrophobic crosslinking agents are multi-arm multi-telechelic polyisobutylene stars having acrylate or methacrylate end caps and represented by formula (I):

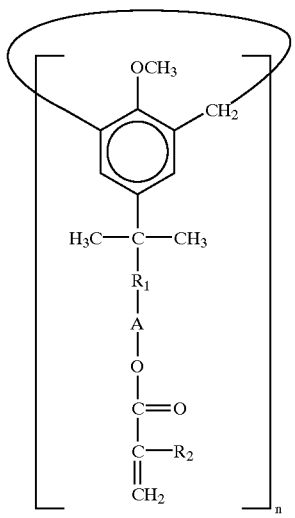 (I)

wherein $R_1$ is polyisobutylene represented by formula (II):

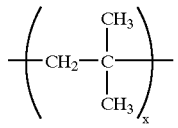 (II)

wherein x is the degree of polymerization of said polyisobutylene;

wherein $R_2$ is either H or $CH_3$;

wherein A is a moiety that connects $R_1$ to said acrylate or methacrylate end caps; and wherein n is an integer from 4 to 16.

7. The method of claim 6, wherein A comprises at least:

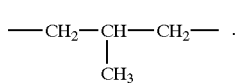 (VII)

8. The method of claim 7, wherein said amphiphilic polymer network is copolymerized and simultaneously crosslinked in a horizontally-disposed and rotating cylinder.

9. An implantable biological device that is capable of encapsulating biologically active moieties, and immunoisolating said moieties from an immunological response of a host individual, said device comprising an amphiphilic network membrane comprising the reaction product of hydrophobic crosslinking agents and hydrophilic monomers, wherein said hydrophobic crosslinking agents are multi-arm multi-telechelic polyisobutylene stars having acrylate or methacrylate end caps and represented by formula (I):

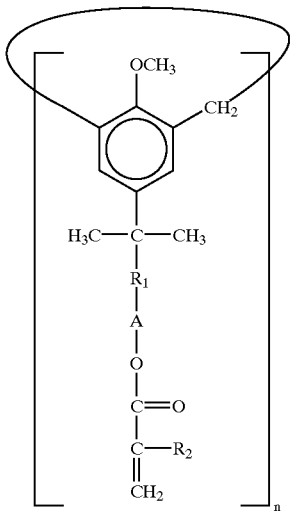

(I)

wherein $R_1$ is polyisobutylene represented by formula (II):

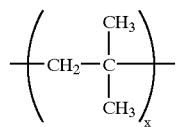

(II)

wherein x is the degree of polymerization of said polyisobutylene;

wherein $R_2$ is either H or $CH_3$;

wherein A is a moiety that connects $R_1$ to said acrylate or methacrylate end caps;

wherein n is an integer from 4 to 16; and wherein said hydrophilic monomers are derived from an acrylate selected from the group consisting of formulas (III), (IV) and (V):

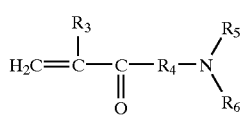

(III)

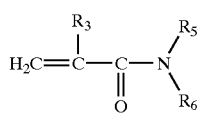

(IV)

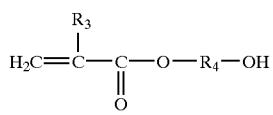

(V)

wherein $R_3$ is hydrogen or methyl, $R_4$ is an alkylene group having from about 2 to about 4 carbon atoms, and $R_5$ and $R_6$ may be the same or different and each is hydrogen or an alkyl radical having 1 to about 4 carbon atoms.

10. The implantable biological device of claim 9, wherein said device is an implantable tubular-shaped device.

11. The implantable biological device of claim 10, wherein said tubular-shaped device has an inner volume of less than about 5 milliliters.

12. The implantable biological device of claim 10, wherein said tubular-shaped device has an inner volume of less than about 1 milliliter.

13. The implantable biological device of claim 10, wherein a membrane wall of said tubular-shaped device has thickness of about 0.001 cm to about 0.2 centimeters.

14. The implantable biological device of claim 10, wherein the length of said tubular-shaped device is from about 1 to about 50 cm.

15. The implantable biological device of claim 10, wherein the diameter of said tubular-shaped device is less than about 2 mm.

16. The implantable biological device of claim 10, wherein said biologically active moieties are selected form the group consisting of cells, tissues, proteins, growth factors, pharmacological agents, and cytokines.

17. The implantable biological device of claim 16, wherein said cells are pancreatic islet cells.

18. The implantable biological device of claim 17, wherein said pancreatic islet cells are selected from porcine and bovine islet cells.

19. The implantable biological device of claim 16, wherein said pharmacological agent is selected from the group consisting of anti-bacterial agents, anti-viral agents and anti-fungal agents.

20. A method for producing an implantable biological device comprising the steps of providing an amphiphilic network comprising the reaction product of hydrophobic crosslinking agents and hydrophilic monomers, wherein said hydrophobic crosslinking agents are multi-arm multi-telechelic polyisobutylene stars having acrylate or methacrylate end caps and represented y formula (I):

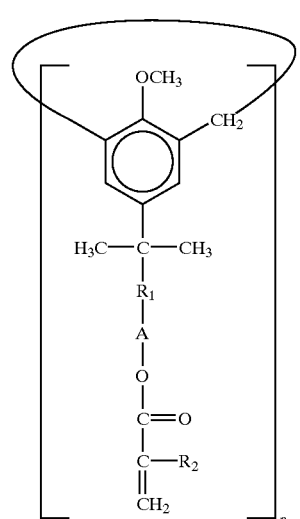

(I)

wherein $R_1$ is polyisbutylene represented by formula (II):

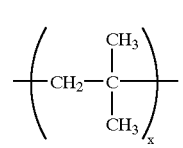

(II)

wherein x is the degree of polymerization of said polyisobutylene;

wherein $R_2$ is either H or $CH_3$;

wherein A is a moiety that connects $R_1$ to said acrylate or methacrylate end caps;

wherein n is an integer from 4 to 16; and wherein said hydrophilic monomers are derived from an acrylate selected from the group consisting of formulas (III), (IV) and (V):

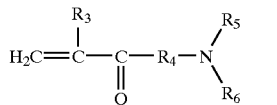

(III)

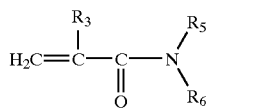

(IV)

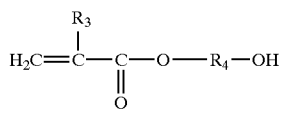

(V)

wherein $R_3$ is hydrogen or methyl, $R_4$ is an alkylene group having from about 2 to about 4 carbon atoms, and $R_5$ and $R_6$ may be the same or different and each is hydrogen or an alkyl radical having 1 to about 4 carbon atoms; and forming said amphiphilic network into a desired three-dimensional shape.

21. A method for treating Type I diabetes in a diabetic host individual comprising the steps of providing an amphiphilic network comprising the reaction product of hydrophobic crosslinking agents and hydrophilic monomers, wherein said hydrophobic crosslinking agents are multi-arm multi-telechelic polyisobutylene stars having acrylate or methacrylate end caps and represented by formula (I):

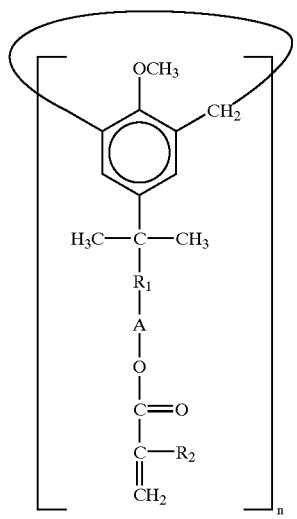

(I)

wherein $R_1$ is polyisobutylene represented by formula (II):

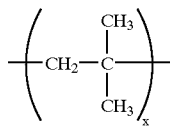

(II)

wherein x is the degree of polymerization of said polyisobutylene;

wherein $R_2$ is either H or $CH_3$;

wherein A is a moiety that connects $R_1$ to said acrylate or methacrylate end caps;

wherein n is an integer from 4 to 16; and wherein said hydrophilic monomers are derived from an acrylate selected from the group consisting of formulas (III), (IV) and (V):

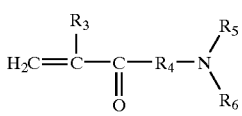

(III)

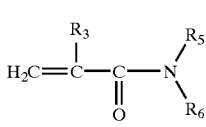

(IV)

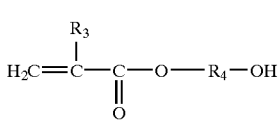

(V)

wherein $R_3$ is hydrogen or methyl, $R_4$ is an alkylene group having from about 2 to about 4 carbon atoms, and $R_5$ and $R_6$ may be the same or different and each is hydrogen or an alkyl radical having 1 to about 4 carbon atoms;

forming said amphiphilic network into an elongated tubular device;

encasing a sufficient amount of islet of pancreatic cells within said tubular device, wherein said tubular device is capable of immunoisolating said encased islet cells upon implantation into a diabetic-host individual;

implanting said tubular device into said diabetic-host individual;

allowing said implanted tubular device to remain implanted in said diabetic-host individual for a time sufficient to normalize the blood glucose level in said diabetic-host individual.

22. The method of claim 21, wherein the islet cells are selected from porcine and bovine pancreatic islet cells.

* * * * *

UNITED STATES PATENT AND TRADEMARK OFFICE
CERTIFICATE OF CORRECTION

PATENT NO. : 6,727,322 B2
DATED : April 27, 2004
INVENTOR(S) : Kennedy et al.

It is certified that error appears in the above-identified patent and that said Letters Patent is hereby corrected as shown below:

Column 26,

Line 49, " $\underset{\underset{CH_3}{|}}{-CH_2-CH-CH_2-}$ (VII) " should read -- $-CH_2-CH_2-CH_2-$ (VI)

or $\underset{\underset{CH_3}{|}}{-CH_2-CH-CH_2-}$ (VII) --

Column 18,
Line 14, "form" should read -- from --

Signed and Sealed this

Seventh Day of December, 2004

JON W. DUDAS
*Director of the United States Patent and Trademark Office*